US010821930B2

(12) United States Patent
Malapati et al.

(10) Patent No.: US 10,821,930 B2
(45) Date of Patent: Nov. 3, 2020

(54) VEHICLE AIRBAG

(71) Applicant: Ford Global Technologies, LLC, Dearborn, MI (US)

(72) Inventors: Srinivas Reddy Malapati, Novi, MI (US); Gustavo Morales Cabrera, Ecatepec de Morelos (MX); Luis Enrique Castillo Jaime, Distrito Federal (MX); Jorge Carlos Tellez Valdes, Calimaya (MX)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 16/137,951

(22) Filed: Sep. 21, 2018

(65) Prior Publication Data

US 2020/0094766 A1    Mar. 26, 2020

(51) Int. Cl.
| B60R 21/231 | (2011.01) |
| B60R 21/205 | (2011.01) |
| B60R 21/16 | (2006.01) |
| B60R 21/015 | (2006.01) |
| B60R 21/0136 | (2006.01) |
| B60R 21/264 | (2006.01) |
| B60R 21/013 | (2006.01) |

(52) U.S. Cl.
CPC ........ *B60R 21/231* (2013.01); *B60R 21/0136* (2013.01); *B60R 21/01512* (2014.10); *B60R 21/16* (2013.01); *B60R 21/205* (2013.01); *B60R 21/264* (2013.01); *B60R 2021/01315* (2013.01); *B60R 2021/161* (2013.01)

(58) Field of Classification Search
CPC .................. B60R 21/205; B60R 2021/161
See application file for complete search history.

(56) References Cited

U.S. PATENT DOCUMENTS

| 4,951,963 | A | | 8/1990 | Behr et al. | |
| 5,344,184 | A | * | 9/1994 | Keeler | B60R 21/045 280/730.1 |
| 5,360,231 | A | | 11/1994 | Adams | |
| 5,507,521 | A | * | 4/1996 | Steffens, Jr. | B60R 21/203 180/282 |
| 5,842,738 | A | | 12/1998 | Knoll et al. | |
| 6,024,377 | A | * | 2/2000 | Lane, Jr. | B60R 21/20 280/728.3 |
| 6,158,812 | A | * | 12/2000 | Bonke | B60R 16/08 297/391 |
| 6,293,584 | B1 | * | 9/2001 | Levine | B60K 23/02 280/735 |
| 6,916,040 | B1 | * | 7/2005 | Levine | B60K 23/02 280/735 |

(Continued)

FOREIGN PATENT DOCUMENTS

| DE | 102016100453 A1 * | 7/2017 | .......... B60R 21/205 |
| KR | 100208839 B1 | 7/1999 | |

(Continued)

*Primary Examiner* — Nicole T Verley

(74) *Attorney, Agent, or Firm* — Frank A. MacKenzie; Bejin Bieneman PLC

(57) ABSTRACT

An assembly includes a track and a base movable along the track. The assembly includes an airbag supported by the base. The assembly includes a pyrotechnic device designed to move the base along the track.

19 Claims, 6 Drawing Sheets

(56) References Cited

U.S. PATENT DOCUMENTS

| | | | |
|---|---|---|---|
| 7,393,012 B2* | 7/2008 | Funakura | B60R 21/045 280/748 |
| 7,494,152 B2* | 2/2009 | Schuler | B60R 21/013 280/752 |
| 7,540,531 B2 | 6/2009 | Sakakibara et al. | |
| 7,600,779 B2* | 10/2009 | Tsujimura | B60R 21/21 280/728.2 |
| 7,798,521 B2* | 9/2010 | Bito | B60R 21/206 280/730.1 |
| 7,874,576 B2* | 1/2011 | Gandhi | B60R 21/203 280/728.2 |
| 8,033,356 B2* | 10/2011 | Kim | B60R 21/36 180/271 |
| 8,910,971 B1* | 12/2014 | Faruque | B60R 21/01 280/728.2 |
| 9,487,177 B2* | 11/2016 | Schneider | B60R 21/206 |
| 9,821,746 B1* | 11/2017 | O'Connor | B60R 21/01 |
| 9,908,496 B2 | 3/2018 | Choi | |
| 9,919,673 B2* | 3/2018 | Ohno | B60R 21/262 |
| 9,963,101 B2 | 5/2018 | El-Jawahri et al. | |
| 10,160,417 B2* | 12/2018 | Malapati | B60R 21/217 |
| 10,322,691 B2* | 6/2019 | Ohmi | B60R 21/231 |
| 10,427,634 B2* | 10/2019 | Gandhi | B60R 21/217 |
| 2006/0284400 A1 | 12/2006 | Sakakibara et al. | |
| 2007/0102908 A1 | 5/2007 | Schuler et al. | |
| 2010/0127483 A1 | 5/2010 | Seo | |
| 2017/0088086 A1 | 3/2017 | El-Jawahri et al. | |
| 2017/0136976 A1 | 5/2017 | Ohno et al. | |

FOREIGN PATENT DOCUMENTS

| | | |
|---|---|---|
| KR | 20100026791 A | 3/2010 |
| WO | 0144026 A1 | 6/2001 |

* cited by examiner

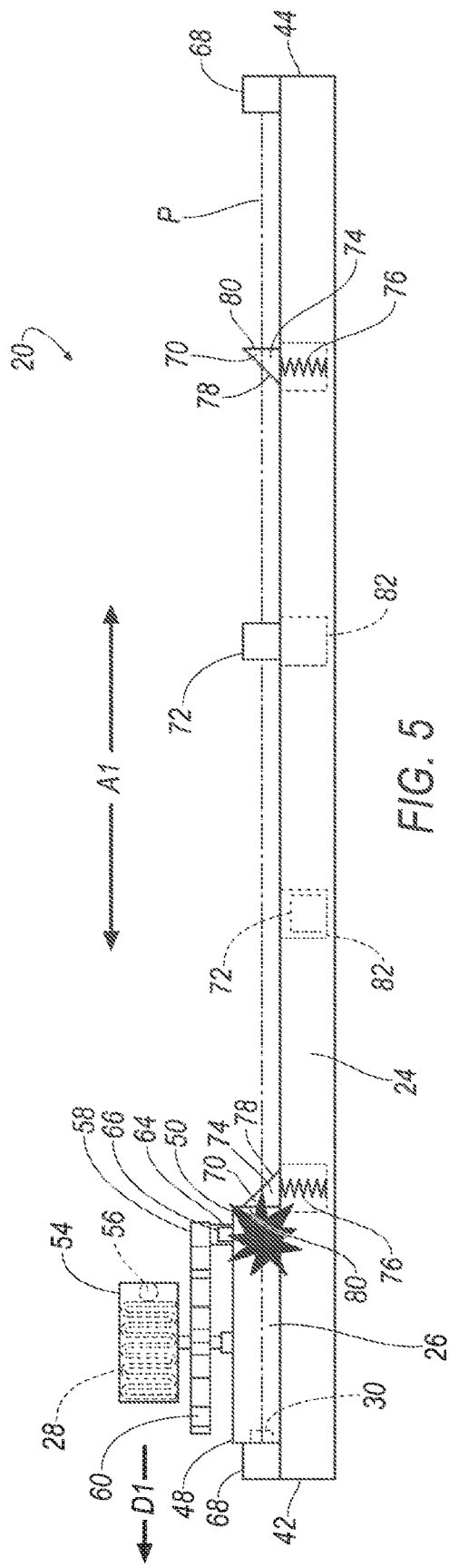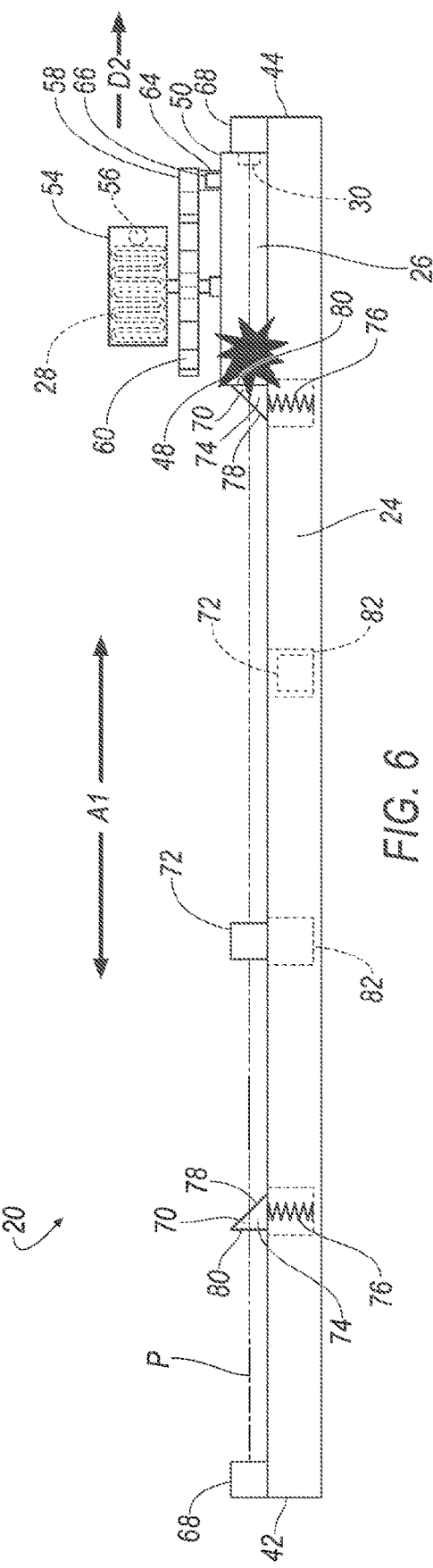

VEHICLE AIRBAG

BACKGROUND

A vehicle may include a variety of airbags that can deploy during a vehicle impact to absorb energy and control kinematics of an object within the vehicle. The airbag may be a component of an airbag assembly including a housing supporting the airbag, and an inflator in fluid communication with the airbag for inflating the airbag from an uninflated position to an inflated position. Airbag assemblies may be supported by a steering wheel of the vehicle, an instrument panel of the vehicle, a headliner of the vehicle, etc.

BRIEF DESCRIPTION OF THE DRAWINGS

FIG. 5 is a side view of the airbag assembly having the base at a first distal end of the track.

FIG. 6 is a side view of the airbag assembly having the base at a second distal end of the track.

DETAILED DESCRIPTION

Figure 1:
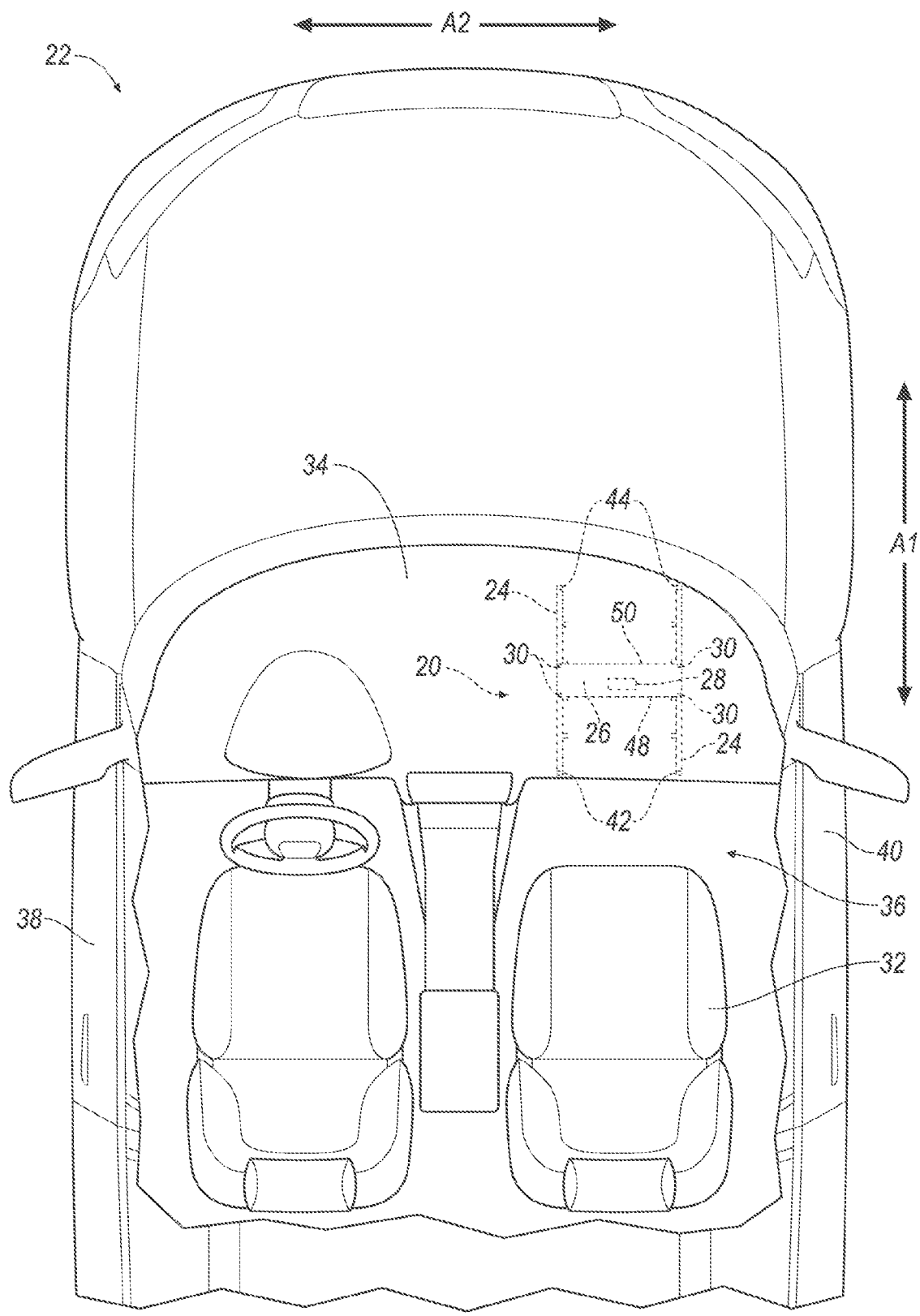
FIG. 1 is a top view of a vehicle having an airbag assembly.
Figure 2:
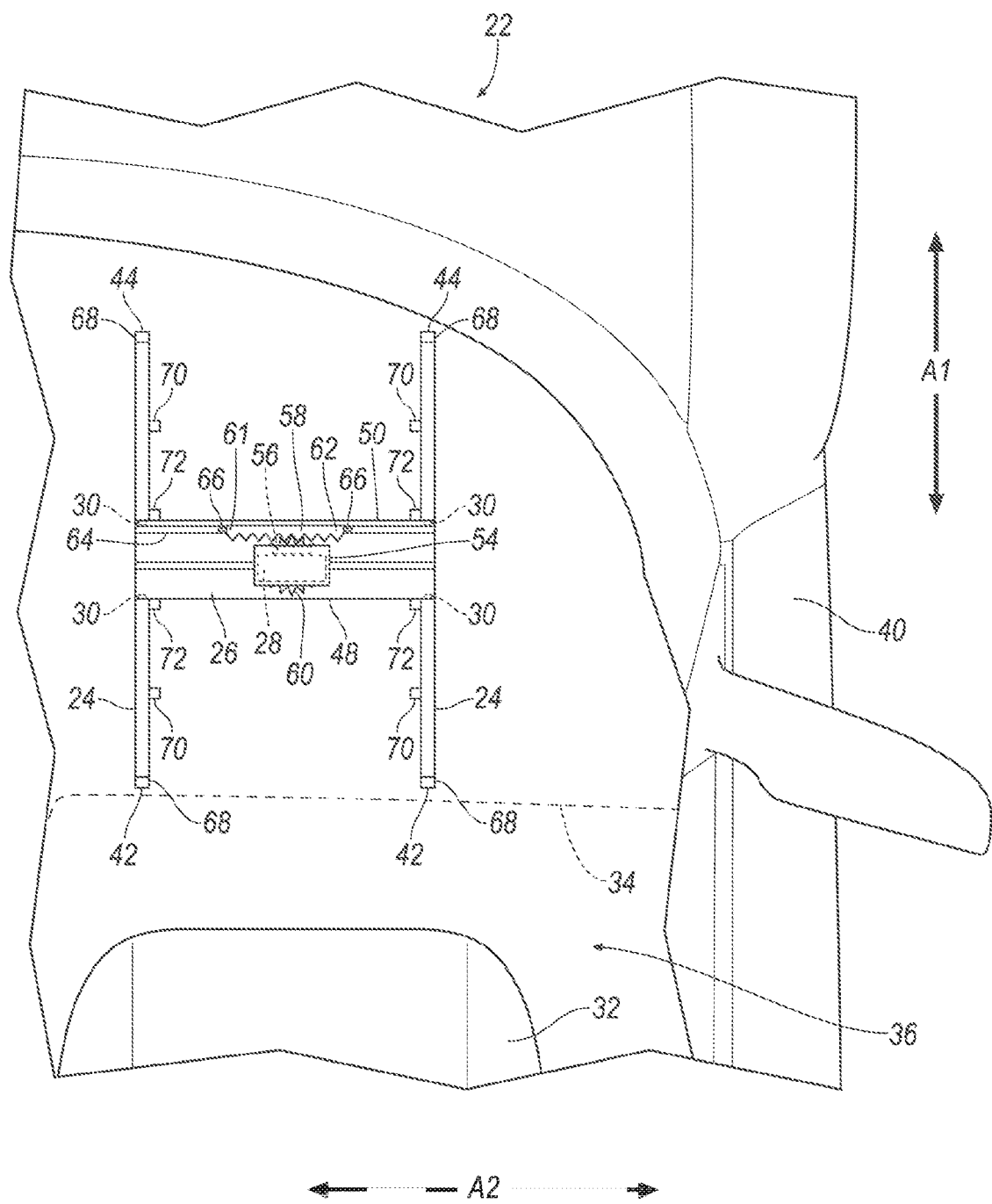
FIG. 2 is a top view of a portion of the vehicle having the airbag assembly.

An assembly includes a track and a base movable along the track. The assembly includes an airbag supported by the base. The assembly includes a pyrotechnic device designed to move the base along the track.

The assembly may include a stop supported by the track.

The stop may be movable from an engaged position to a disengaged position.

The assembly may include an actuator designed to move the stop to the disengaged position.

The airbag may be rotatable relative to the base.

The pyrotechnic device may be designed to move the base along the track in a first direction, and the assembly may include a second pyrotechnic device designed to move the base along the track in a second direction opposite the first direction.

A vehicle includes an instrument panel and a track supported by the instrument panel. The vehicle includes a base movable along the track. The vehicle includes an airbag supported by the base. The vehicle includes a pyrotechnic device designed to move the base along the track.

The vehicle may include a seat, the base movable along the track toward the seat.

The vehicle may include a seat, the base movable along the track away from the seat.

The track may be elongated along a vehicle-longitudinal axis.

The vehicle may include a processor and a memory storing instructions to actuate the pyrotechnic device based on an occupant size.

The vehicle may include a processor and a memory storing instructions to actuate the pyrotechnic device based on an occupant position.

The vehicle may include a stop supported by the track and movable from an engaged position to a disengaged position.

The vehicle may include a processor and a memory storing instructions to move the stop from the engaged position to the disengaged position based on at least one of an occupant size or an occupant position.

The airbag may be rotatable relative to the base.

The vehicle may include a first side and a second side spaced from the first side along a cross-vehicle axis, wherein the airbag rotates to direct deployment of the airbag toward one of the first side of the vehicle or the second side of the vehicle.

The vehicle may include a processor and a memory storing instructions to rotate the airbag based on at least one of an occupant position or a vehicle impact direction.

The pyrotechnic device may be designed to move the base along the track in a first direction, and the vehicle may include a second pyrotechnic device designed to move the base along the track in a second direction opposite the first direction.

The vehicle may include a processor and a memory storing instructions to actuate the pyrotechnic device and to refrain from actuating the second pyrotechnic device based on at least one of an occupant size or an occupant position.

With reference to the Figures, wherein like numerals indicate like parts throughout the several views, an airbag assembly 20 for a vehicle 22 includes a track 24 and a base 26 movable along the track 24. The airbag assembly 20 includes an airbag 28 supported by the base 26. The airbag assembly 20 includes a pyrotechnic device 30 designed to move the base 26 along the track 24. Movement of the base 26 along the track 24 changes a position of the airbag 28 relative to an object in the vehicle 22, e.g., relative to a seat 32 of the vehicle 22. Movement of the airbag 28, e.g., toward or away from the seat 32 varies control of kinematics of an object in the vehicle 22 during a vehicle impact when the airbag 28 is inflated.

The vehicle 22 may be any type of passenger or commercial automobile such as a car, a truck, a sport utility vehicle, a crossover vehicle, a van, a minivan, a taxi, a bus, etc. The vehicle 22 may be, for example, an autonomous vehicle that can operate in an autonomous (e.g., driverless) mode, a partially autonomous mode, and/or a non-autonomous mode. The vehicle 22 may define a longitudinal axis A1, e.g., extending between a front and a rear of the vehicle 22. The vehicle 22 may define a cross-vehicle axis A2, e.g., extending between a left side and a right side of the vehicle 22. The longitudinal axis A1 and the cross-vehicle axis A2 may be perpendicular to each other. The front, rear, left and right sides, etc., may be relative to an orientation of an occupant of the vehicle 22. The front, rear, left and right sides, etc., may be relative to an orientation of controls for operating the vehicle 22, e.g., an instrument panel 34. The front, rear, left and right sides, etc., may be relative to a driving direction of the vehicle 22 when wheels of the vehicle 22 are all parallel with each other.

The vehicle 22 includes a passenger cabin 36. The passenger cabin 36 includes one or more seats 32. The seats 32 are shown as bucket seats, but the seats 32 may be other types. The position and orientation of the seats 32 and components thereof may be adjustable. For example, the seats 32 may translate relative to a floor of the vehicle 22, along the longitudinal axis A1, etc.

The vehicle 22 includes the instrument panel 34. The instrument panel 34 may be disposed at a forward end of the passenger cabin 36 and face toward the seats 32. The instrument panel 34 may include vehicle controls, e.g., a steering wheel, etc.

The vehicle 22 includes a first side 38. The vehicle 22 includes a second side 40 spaced from the first side 38 along the cross-vehicle axis A2. For example, the first side 38 may be the left side, a driver side, etc. The second side 40 may be the right side, a passenger side, etc. The adjectives "first" and "second" are used throughout this document as identifiers and are not intended to signify importance or order.

The track 24 controls movement of the base 26. For example, the track 24 may include a channel, lip, guide, etc., that operatively engages the base 26 to permit movement along the track 24 and inhibit movement transverse to the track 24. The track 24 may be elongated along the longitudinal axis A1. For example, the track 24 may be elongated between a first distal end 42 and a second distal end 44 spaced from the first distal end 42 along the longitudinal axis A1. The first distal end 42 may be between one of the seats 32 and the second distal end 44. The track 24 may be supported by the instrument panel 34, or any suitable vehicle component.

The base 26 is movable along the elongation of the track 24. In other words, the base 26 may be supported by and translate, e.g., roll, slide, etc., along the track 24 along the longitudinal axis A1. The base 26 may be movable along the track 24 toward the seat 32. For example, the base 26 may move along the track 24 away from the second distal end 44 and toward the first distal end 42. The base 26 may be movable along the track 24 away from the seat 32. For example, the base 26 may move along the track 24 away from the first distal end 42 and toward the second distal end 44. Movement of the base 26 along the track 24 may define a path P, shown in FIGS. 3-6.

The base 26 may include a first end 48 and a second end 50 opposite the first end 48. The first end 48 may be between the second end 50 and the first distal end 42 of the track 24. The second end 50 may be between the first end 48 and the second distal end 44. The base 26 may be metal, plastic, or any suitable material.

One or more pyrotechnic devices 30 are designed to move the base 26 along the track 24. Each pyrotechnic device 30 includes pyrotechnic material that detonates upon actuation, e.g., upon receipt of a command, such as an electrical pulse, from a computer 52. For example, the one or more pyrotechnic devices 30 may be placed in a position and orientation such that an expansion of such pyrotechnic devices 30 upon actuation and subsequent detonation urges the base 26 along the track 24.

Figure 3:
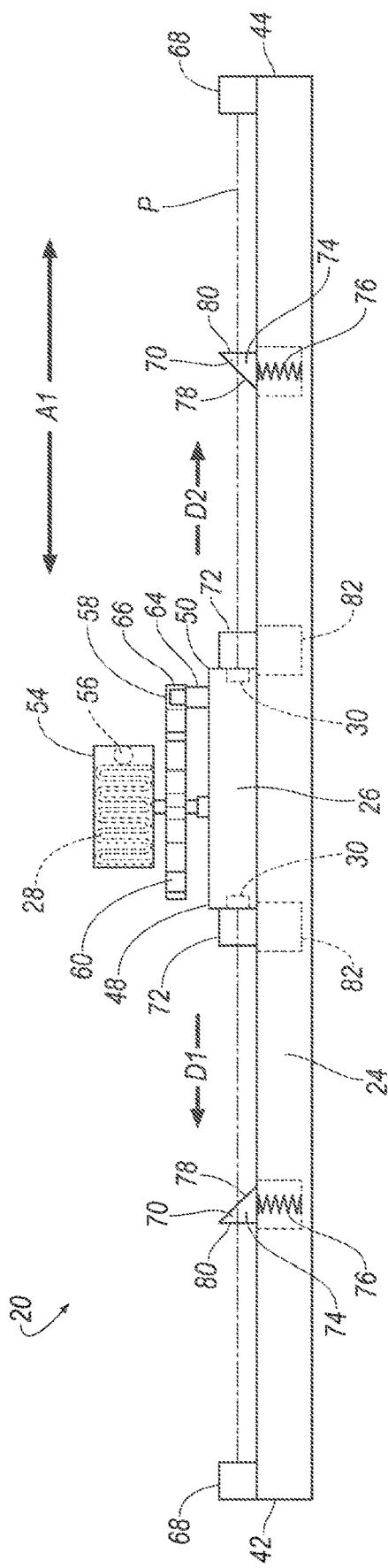
FIG. 3 is a side view of the airbag assembly.
Figure 4:
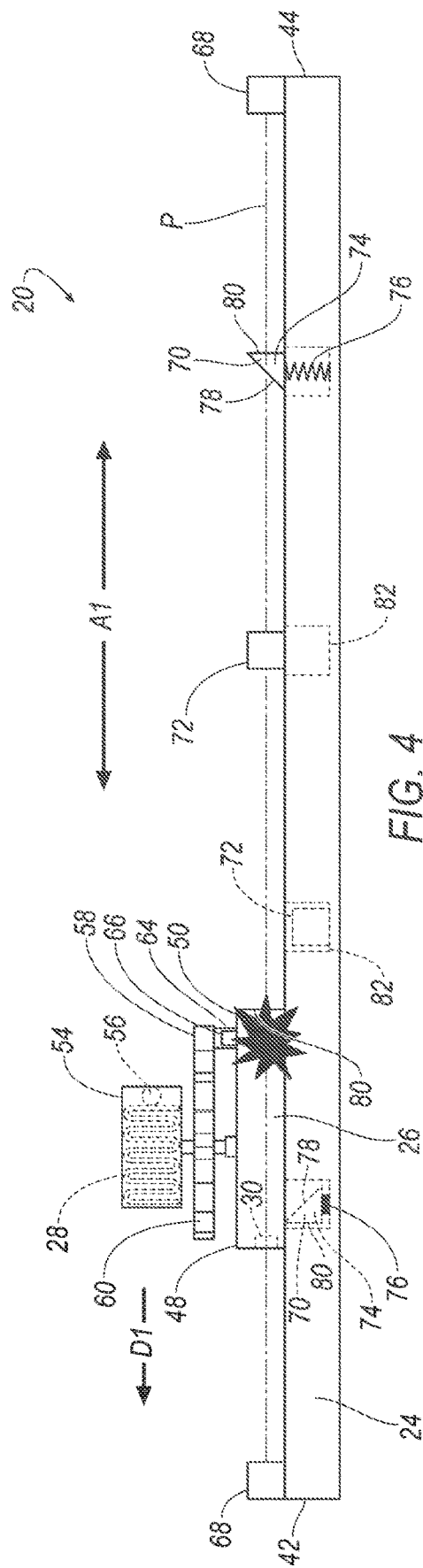
FIG. 4 is a side view of the airbag assembly having a base moving in a first direction along a track.

One or more pyrotechnic devices 30 may be designed to move the base 26 along the track 24 in a first direction D1, shown in FIGS. 3-5. The first direction D1 may be along the longitudinal axis A1. The first direction D1 may be toward the first end 48. The first direction D1 may be toward the seat 32. For example, such pyrotechnic devices 30 may be at the second end 50 of the base 26.

One or more pyrotechnic device 30 may be designed to move the base 26 along the track 24 in a second direction D2, shown in FIGS. 3 and 6. The second direction D2 may be opposite the first direction D1. The second direction D2 may be along the longitudinal axis A1. The second direction D2 may be toward the second end 50. The second direction D2 may be away from the seat 32. For example, such pyrotechnic devices 30 may be at the first end 48 of the base 26.

One or more airbags 28 are supported by the base 26, e.g., via one or more housings 54. Each airbag 28 may be formed of a woven polymer or any other material. As one example, the airbag 28 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

An inflator 56 may be connected to the airbag 28. Upon receiving a signal from, e.g., the computer 52, the inflator 56 may inflate the airbag 28 with an inflatable medium, such as a gas. The inflator 56 may be, for example, a pyrotechnic inflator that uses a chemical reaction to drive inflation medium to the airbag 28. The inflator 56 may be of any suitable type, for example, a cold-gas inflator.

The housing 54 houses the airbag 28 in an uninflated position, as shown in FIGS. 1-6, and supports the airbag 28 in an inflated position (not shown). The airbag 28 may be rolled and/or folded to fit within the housing 54 in the uninflated position. The housing 54 may be of any suitable material, e.g., a rigid polymer, a metal, a composite, or a combination of rigid materials. The housing 54 of the airbag assembly 20 may be supported by the base 26.

The airbag 28, e.g., the housing 54 supporting the airbag 28, may be rotatable relative to the base 26. For example, the airbag 28 may rotate to direct deployment of the airbag 28 toward one of the first side 38 of the vehicle 22 or the second side 40 of the vehicle 22. To enable rotation, the airbag assembly 20 may include a rack 58 and a pinion 60 supported by the base 26, as further described below. Other structure(s) may rotate the airbag 28 relative to the housing 54.

The pinion 60 may be supported by the base 26. The pinion 60 may be fixed to the airbag 28, e.g., to the housing 54, to reduce and/or inhibit relative rotation therebetween. In other words, the pinion 60 may be connected to the airbag 28 such that rotation of the pinion 60 causes rotation of the airbag 28. The pinion 60 includes an arcuate set of gear teeth. Although shown in the figures as having gear teeth that completely surround the pinion 60, i.e., the gear teeth complete a full 360-degree arc around the pinion 60, the gear teeth need not surround the pinion 60, e.g., the arcuate set of gear teeth may only be provided along a portion of the pinion 60, e.g., the gear teeth may only complete a 90-degree arc. The arc length, e.g., the degrees of the arc length of the set of gear teeth, may be determined based on a desired rotation of the airbag 28, e.g., an amount of rotation toward the first side 38 and/or the second side 40 of the vehicle 22.

The rack 58 may be supported by the base 26. The rack 58 may be elongated between a first distal end 61 and a second distal end 62. The rack 58 may define a track 64, e.g., a channel, a lip, a groove, a guide, etc., that controls movement of the rack 58, e.g., in a linear direction, relative to the base 26. Specifically, the rack 58 is positioned such movement of the rack 58, e.g., along the track 64, causes the gear teeth of the rack 58 to mesh with the gear teeth of the pinion 60 and rotates the pinion 60 relative to the base 26. In the meshed arrangement, linear movement of the rack 58 causes rotational movement of the pinion 60 via the gear teeth of the rack 58 and the gear teeth of the pinion 60.

The airbag assembly 20 may include one or more second pyrotechnic devices 66. The second pyrotechnic devices 66 are designed to rotate the airbag 28 relative to the base 26, e.g., toward the first side 38 or the second side 40 of the vehicle 22. For example, the one or more of the second pyrotechnic devices 66 may be placed in a position and orientation such that an expansion of such pyrotechnic devices 66 upon actuation and subsequent detonation causes the airbag 28 to rotate toward the first side 38 of the vehicle 22. For example, such second pyrotechnic devices 66 may be at the first distal end 61 of the rack 58 to urge the rack 58 toward the second side 40 of the vehicle 22. As another example, the one or more of the second pyrotechnic devices 66 may be placed in a position and orientation such that an expansion of such pyrotechnic devices 30 upon actuation and subsequent detonation causes the airbag 28 to rotate toward the second side 40 of the vehicle 22. For example, such second pyrotechnic devices 66 may be at the second distal end 62 of the rack 58 to urge the rack 58 toward the first side 38 of the vehicle 22.

The airbag assembly 20 may include one or more stops 68, 70, 72. The stops 68, 70, 72 limit movement of the base 26 along the track 24. For example, the stops 68, 70, 72 may be in the path P, e.g., blocking movement of the base 26 there past. The stops 68, 70, 72 may be supported by the track 24, or any suitable vehicle component.

The stops 68 may be fixed in position. For example, the stops 68 may be fixed at the first distal end 42 and the second distal end 44 of the track 24, e.g., to inhibit movement of the base 26 past such ends 42, 44.

The stops 70, 72 may be movable from an engaged position that inhibits movement of the base 26 along the track 24 to a disengaged position that permits movement of the base 26 along the track 24, and vise-versa. For example, the stops 70, 72 in the engaged position may be in the path P, and the stops 70, 72 in the disengaged position may be out of the path P. The stops 72 are shown in the engaged position in FIGS. 3-6, and in the disengaged position in FIGS. 4-6. The stops 70 are shown in the engaged position in FIGS. 3-6, and in the disengaged position in FIG. 4.

Movement of the stop 70 to the disengaged position may be caused by movement of the base 26. For example, the stop 70 may include a latch 74 and a spring 76 urging the latch 74 to the engaged position. The latch 74 may include a reaction surface 78 and an abutment surface 80. Normal forces between the base 26 and the reaction surface 78, e.g., caused by movement of the base 26 toward the reaction surface 78, urge the latch 74 toward the disengaged position, e.g., out of the path P, as shown in FIG. 4. Normal forces between the abutment surface 80 and the base 26 inhibit movement of the base 26.

Movement of the stop 72 to the engaged position and/or the disengaged position may be controlled with the computer 52. For example, the airbag assembly 20 may include an actuator 82 designed to move the stop 72 to the disengaged position and/or the engaged position. The actuator 82 may be a linear actuator, an electromechanical actuator, etc. The actuator 82 may be connected to the stop 72 and move between an extended position and a retracted position. In the extended position the stop 72 may be in the engaged position, and in the retracted position the stop 72 may be in the disengaged position. The actuator 82 may move the stop 72 in response to an instruction from the computer 52.

Figure 7:
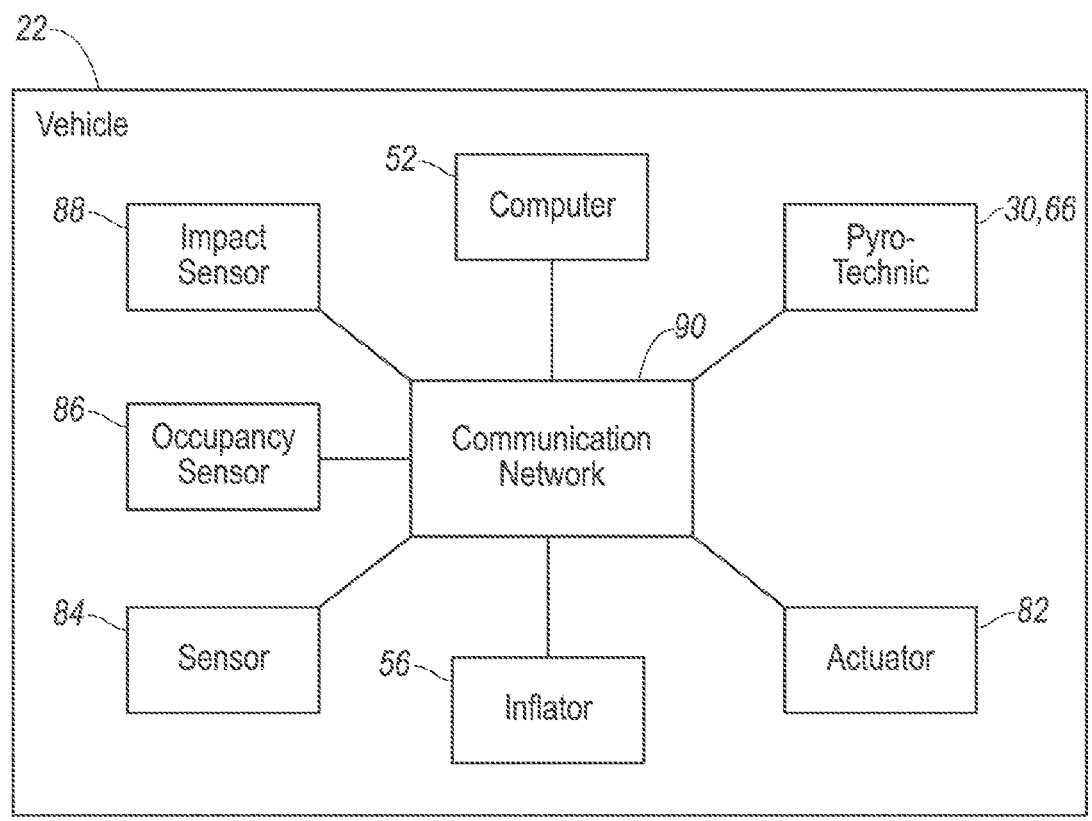
FIG. 7 is a block diagram of components of the vehicle.

With reference to FIG. 7, the vehicle 22 may include sensors 84. The sensors 84 may detect positions of the seats 32, e.g., relative to the longitudinal axis A1, the instrument panel 34, etc. The sensors 84 may be contact switches, proximity sensors, hall effect sensors, etc.

The vehicle 22 may include an occupancy sensor 86 programmed to detect occupancy of the seat(s) 32. The occupancy sensor 86 may be visible-light or infrared cameras directed at the seat 32, weight sensors, sensors detecting whether a seatbelt for the seat 32 is buckled or unspooled, or other suitable sensors. The occupancy sensor 86 may detect a position of an object in one of the seats 32, e.g., a distance from such object to the instrument panel 34, a distance from such object to the first side 38 and/or the second side 40, etc.

The vehicle 22 may include an impact sensor 88. The impact sensor 88 is programmed to detect an impact to the vehicle 22. The impact sensor 88 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 88 may be located at numerous points in or on the vehicle.

The vehicle 22 may include a communication network 90. The communication network 90 includes hardware, such as a communication bus, for facilitating communication among vehicle components, e.g., the pyrotechnic devices 30, the second pyrotechnic devices 66, the actuator 82, the occupancy sensor 86, the impact sensor 88, the inflator 56, the computer 52, the sensors 84, etc. The communication network 90 may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 52 may be a microprocessor-based computing device implemented via circuits, chips, or other electronic components. For example, the computer 52 may include a processor, memory, etc. The memory of the controller may store instructions executable by the processor as well as data and/or databases.

The memory may store instruction executable by the processor to detect and identify an impact to the vehicle 22. The computer 52 may identify whether the vehicle 22 has received an impact to one of the sides, e.g., an oblique or side impact to the first side 38 or the second side 40 of the vehicle 22. The computer 52 may identify an amount of such impact. The computer 52 may make such identifications based on information received from the impact sensor 88 via the communication network 90.

The memory may store instruction executable by the processor to inflate the airbag 28. For example, the computer 52 may transmit an instruction to the inflator 56, e.g., in response to detecting a vehicle impact.

The memory may store instructions executable by the processor to actuate the pyrotechnic devices 30 at the first end 48 of the base 26 and to refrain from actuating the pyrotechnic devices 30 at the second end 50 of the base 26, and vice versa. For example, the computer 52 may actuate the pyrotechnic devices 30 at the second end 50 of the base 26 and refrain from actuating the pyrotechnic devices 30 at the first end 48 of the base 26 to move the base 26 toward the first distal end 42 of the track 24. As another example, the computer 52 may actuate the pyrotechnic devices 30 at the first end 48 of the base 26 and refrain from actuating the pyrotechnic devices 30 at the second end 50 of the base 26 to move the base 26 toward the second distal end 44 of the track 24. The pyrotechnic devices 30 may be actuated in response to detecting a vehicle impact, e.g., prior to inflating the airbag 28, concurrently with inflating the airbag 28, etc.

The memory may store instructions executable by the processor to selectively actuate and refrain from actuating one or more of the pyrotechnic devices 30 to move the base 26 toward the first distal end 42 or the second distal end 44 of the track 24 based on an occupant size. The occupant size may be detected by the occupancy sensor 86 and transmitted to the computer 52 via the communication network 90. For example, the occupancy sensor 86 may detect a weight of an object in the seat 32. The computer 52 may compare the detected weight of the object in the seat 32 with one or more weight thresholds. When the detected weight of the object is below a first threshold, e.g., 100 pounds, the computer 52 may actuate selectively actuate and refrain from actuating one or more of the pyrotechnic devices 30 to move the base 26 toward the second distal end 44, e.g., away from the seat 32. When the detected weight of the object is above a second threshold that is higher than the first threshold, e.g., 200 pounds, the computer 52 may actuate selectively actuate and refrain from actuating one or more of the pyrotechnic devices 30 to move the base 26 toward the first distal end 42, e.g., toward the seat 32.

The memory may store instructions executable by the processor to selectively actuate and refrain from actuating one or more of the pyrotechnic devices 30 to move the base 26 toward the first distal end 42 or the second distal end 44 of the track 24 based an occupant position. The occupant position may be detected by the occupancy sensor 86, e.g., a camera, a proximity sensor, etc., may transmit information to the computer 52 indicating a distance from an object in the seat 32 to the instrumental panel, e.g., via the communication network 90. The occupant position may be detected based on information from the sensors 84, e.g., inflation a position of the seat 32 along the longitudinal axis A1, e.g., relative to the instrument panel 34. When the detected occupant position is within a first threshold distance of the instrument panel 34, e.g., 24 inches, the computer 52 may actuate selectively actuate and refrain from actuating one or more of the pyrotechnic devices 30 to move the base 26 toward the second distal end 44, e.g., away from the seat 32. When the detected occupant position is further than a second threshold distance of the instrument panel 34, e.g., 36 inches, the computer 52 may actuate selectively actuate and refrain from actuating one or more of the pyrotechnic devices 30 to move the base 26 toward the first distal end 42, e.g., toward the seat 32.

The memory may store instructions executable by the processor to move the stop from the engaged position to the disengaged position. For example, the computer 52 may transmit an instruction to the actuator 82 via the communication network 90 instructing actuation to the retracted position. The computer 52 may move the stop to the disengaged position in response to detecting a vehicle impact. The computer 52 may move the stop prior to actuating one or more of the pyrotechnic devices 30.

The memory may store instructions executable by the processor to rotate the airbag 28. For example, the computer 52 may transmit an instruction via the communication network 90 to the second pyrotechnic device 66 at the first distal end 42 of the rack 58 to rotate the airbag 28 toward the first side 38 of the vehicle 22. As another example, the computer 52 may transmit an instruction via the communication network 90 to the second pyrotechnic device 66 at the second distal end 44 of the rack 58 to rotate the airbag 28 toward the second side 40 of the vehicle 22. The computer 52 may rotate the airbag 28 in response to detecting a vehicle impact. The computer 52 may rotate the airbag 28 prior to deploying the airbag 28.

The computer 52 may rotate the airbag 28, e.g., toward the first side 38 or the second side 40 of the vehicle 22 based on the occupant position. The computer 52 may detect the occupant position, e.g., along the cross-vehicle axis A2. For example, the occupancy sensor 86, e.g., a camera, a proximity sensor, etc., may transmit information to the computer 52 indicating a distance from an object in the seat 32 to the first side 38 and/or the second side 40 of the vehicle 22. For example, when the computer 52 receives information from the occupancy sensor 86 indicating the object in the seat 32 is between the housing 54 and the first side 38 of the vehicle 22 along the cross-vehicle axis A2, the computer 52 may rotate the airbag 28 to deploy toward the first side 38 of the vehicle 22. As another example, when the computer 52 receives information from the occupancy sensor 86 indicating the object in the seat 32 is between the housing 54 and the second side 40 of the vehicle 22 along the cross-vehicle axis A2, the computer 52 may rotate the airbag 28 to deploy toward the second side 40 of the vehicle 22.

The computer 52 may rotate the airbag 28, e.g., toward the first side 38 or the second side 40 of the vehicle 22 based on the vehicle impact direction. For example, the computer 52 may rotate the airbag 28 to deploy toward the first side 38 of the vehicle 22 when the vehicle impact is detected at the first side 38. As another example, the computer 52 may rotate the airbag 28 to deploy toward the second side 40 of the vehicle 22 when the vehicle impact is detected at the second side 40.

Figure 8:
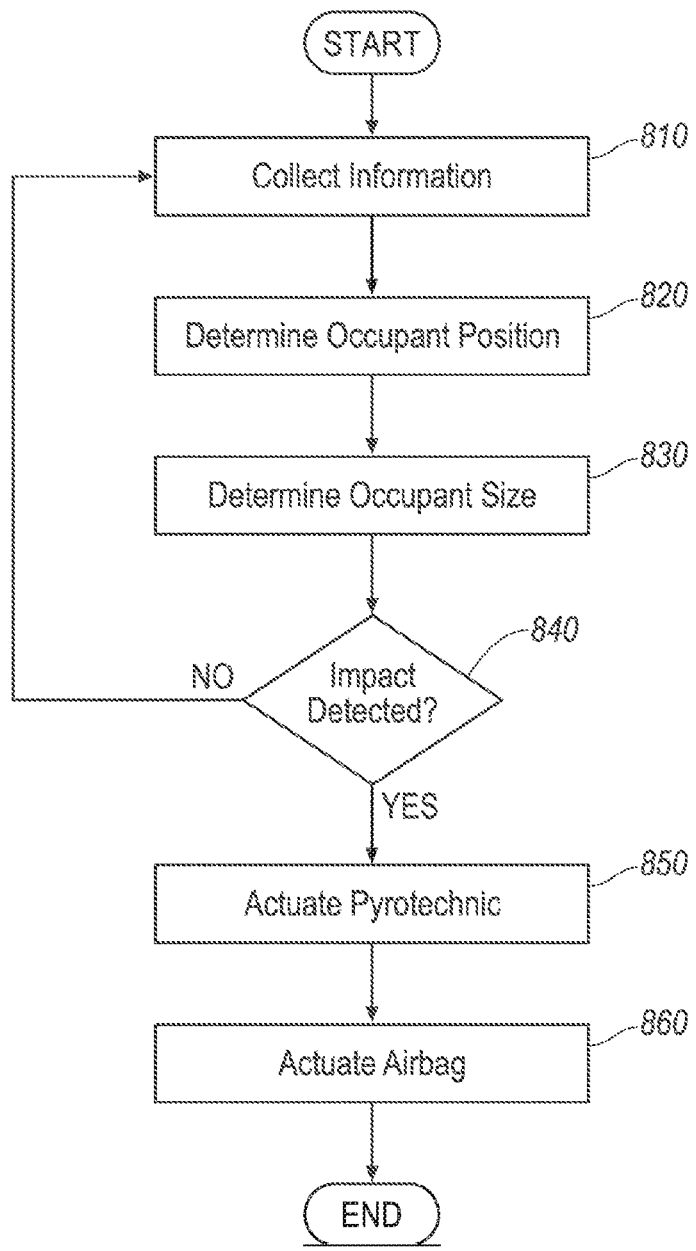
FIG. 8 is a flow chart illustrating a process for controlling the airbag assembly.

FIG. 8 is a process flow diagram illustrating an exemplary process 800 for operating the airbag assembly 20. The process 800 begins in a block 810 where the computer 52 receives information from the sensors 84, the impact sensor 88, the occupancy sensor 86, etc., e.g., via the communication network 90. The computer 52 may receive such information substantially continuously or at time intervals, e.g., every 10 milliseconds.

Next at a block 820 the computer 52 determines the occupant position, e.g., based on information from the occupancy sensor 86, the sensors 84, etc., as described herein.

At a block 830 the computer 52 determines the occupant size, e.g., based on information from the occupancy sensor 86, etc., as described herein At a block 840 the computer 52 determines whether a vehicle impact has been detected, e.g., based on information from the impact sensor 88 as described herein. Upon determining a vehicle impact has not been detected the process 800 returns to the block 810. Upon determining a vehicle impact has been detected the process 800 moves to a block 850. Additionally, the computer 52 may identify a direction of the detected vehicle impact.

At the block 850 the computer 52 may selectively actuate the actuator 82, the pyrotechnic devices 30, and/or the second pyrotechnic devices 66, e.g., to move the base 26 and/or rotate the airbag 28 based on the detected occupant size, the detected occupant position, and/or the vehicle impact direction, e.g., as described herein.

Next, at a block 860 the computer 52 may inflate the airbag 28, e.g., by transmitting an instruction to the inflator 56. After the block 860, the process 800 may end.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments and should in no way be construed so as to limit the disclosed subject matter.

Computing devices, such as the computer 52, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a track;
a base movable along the track;
an airbag supported by the base; and
a pyrotechnic device designed to move the base along the track; and
wherein the airbag is rotatable relative to the base.

2. The assembly of claim 1, further comprising a stop supported by the track.

3. The assembly of claim 2, wherein the stop is movable from an engaged position to a disengaged position.

4. The assembly of claim 3, further comprising an actuator designed to move the stop to the disengaged position.

5. The assembly of claim 1, wherein the pyrotechnic device is designed to move the base along the track in a first direction, and further comprising a second pyrotechnic device designed to move the base along the track in a second direction opposite the first direction.

6. A vehicle, comprising:
an instrument panel;
a track supported by the instrument panel;
a base movable along the track;
an airbag supported by the base;
a pyrotechnic device designed to move the base along the track; and
a processor and a memory storing instructions to actuate the pyrotechnic device based on an occupant size.

7. The vehicle of claim 6, further comprising a seat, the base movable along the track toward the seat.

8. The vehicle of claim 6, further comprising a seat, the base movable along the track away from the seat.

9. The vehicle of claim 6, wherein the track is elongated along a vehicle-longitudinal axis.

10. The vehicle of claim 6, further comprising a processor and a memory storing instructions to actuate the pyrotechnic device based on an occupant position.

11. The vehicle of claim 6, further comprising a stop supported by the track and movable from an engaged position to a disengaged position.

12. The vehicle of claim 11, further comprising a processor and a memory storing instructions to move the stop from the engaged position to the disengaged position based on at least one of an occupant size or an occupant position.

13. The vehicle of claim 6, wherein the airbag is rotatable relative to the base.

14. The vehicle of claim 13, further comprising a first side and a second side spaced from the first side along a cross-vehicle axis, wherein the airbag rotates to direct deployment of the airbag toward one of the first side of the vehicle or the second side of the vehicle.

15. The vehicle of claim 13, further comprising a processor and a memory storing instructions to rotate the airbag based on at least one of an occupant position or a vehicle impact direction.

16. The vehicle of claim 6, wherein the pyrotechnic device is designed to move the base along the track in a first direction, and further comprising a second pyrotechnic device designed to move the base along the track in a second direction opposite the first direction.

17. The vehicle of claim 16, further comprising a processor and a memory storing instructions to actuate the pyrotechnic device and to refrain from actuating the second pyrotechnic device based on at least one of an occupant size or an occupant position.

18. A vehicle, comprising:
an instrument panel;
a track supported by the instrument panel;
a base movable along the track;
an airbag supported by the base;
a pyrotechnic device designed to move the base along the track in a first direction; and
a second pyrotechnic device designed to move the base along the track in a second direction opposite the first direction.

19. The vehicle of claim 18, further comprising a processor and a memory storing instructions to actuate the pyrotechnic device and to refrain from actuating the second pyrotechnic device based on at least one of an occupant size or an occupant position.

* * * * *